(12) United States Patent
Fukuda

(10) Patent No.: US 9,001,204 B2
(45) Date of Patent: Apr. 7, 2015

(54) VEHICLE PERIPHERAL MONITORING DEVICE

(75) Inventor: Hisaya Fukuda, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 374 days.

(21) Appl. No.: 13/500,732

(22) PCT Filed: Sep. 27, 2010

(86) PCT No.: PCT/JP2010/005802
§ 371 (c)(1),
(2), (4) Date: Apr. 6, 2012

(87) PCT Pub. No.: WO2011/043030
PCT Pub. Date: Apr. 14, 2011

(65) Prior Publication Data
US 2012/0200708 A1    Aug. 9, 2012

(30) Foreign Application Priority Data

Oct. 9, 2009    (JP) .................................. 2009-234780

(51) Int. Cl.
*H04N 7/18*    (2006.01)
*B60R 1/00*    (2006.01)

(52) U.S. Cl.
CPC    *H04N 7/183* (2013.01); *B60R 1/00* (2013.01);
*B60R 2300/103* (2013.01); *B60R 2300/302*
(2013.01); *B60R 2300/304* (2013.01);
*B60R2300/8053* (2013.01); *B60R 2300/8093*
(2013.01)

(58) Field of Classification Search
CPC ...... G01S 17/936; H04N 11/18; H04N 7/183; H04N 19/00; G06T 1/00
USPC ........... 348/148, 129, 161; 381/104; 382/104, 382/274; 701/301
See application file for complete search history.

(56) References Cited

U.S. PATENT DOCUMENTS

2006/0203092 A1*    9/2006    Nobori et al. ................. 348/148
2006/0210175 A1*    9/2006    Huang et al. .................. 382/232

FOREIGN PATENT DOCUMENTS

| JP | 2002-029345 A | 1/2002 |
| JP | 2003-250081 A | 9/2003 |
| JP | 2005-030968 A | 2/2005 |
| JP | 2008-174078 A | 7/2008 |

OTHER PUBLICATIONS

International Search Report for PCT/JP2010/005802 dated Mar. 1, 2011.

* cited by examiner

*Primary Examiner* — Andy Rao
*Assistant Examiner* — Jimmy S Lee
(74) *Attorney, Agent, or Firm* — Pearne & Gordon LLP

(57) ABSTRACT

On the basis of the illumination output from the illumination estimation unit (3), a necessary image storage time calculation unit (4) calculates the time required for storing the image in order to acquire the contrast to make image recognition possible. A possible image storage time calculation unit (8) calculates a time in which image storage is feasible using the vehicle speed acquired from a vehicle information acquisition section (7). A recognition possibility determination unit (5) compares the required image storage time and the feasible image storage time, and determines whether or not it is possible to carry out image recognition. If the recognition possibility determination unit (5) determines that recognition is possible, a synthesis of the acquired image data is accumulated/superimposed to generate an image with improved contrast that is displayed on a display device (11).

2 Claims, 7 Drawing Sheets

(a)

(b)

(a) SINGLE FRAME (b) COMBINED PLURALITY OF IMAGES (a) WHEN RECOGNITION IS DIFFICULT  (b) DURING IMAGE PROCESSING  (c) RECOGNITION COMPLETED

VEHICLE PERIPHERAL MONITORING DEVICE

TECHNICAL FIELD

The present invention relates to a vehicle surroundings monitoring apparatus that notifies a user accurately of the situation around a vehicle especially when parking in a dark location, such as at night, in an apparatus that images the area around a vehicle by means of a vehicle-mounted camera and detects an obstacle or the like if present.

BACKGROUND ART

There is, as a conventional vehicle surroundings monitoring apparatus, an apparatus whereby a camera is mounted on a vehicle, and the distance to an obstacle is detected from a captured image of the vehicle's surroundings (see Patent Literature 1). There is also an apparatus that, in a dark location where illumination of a subject is low, reduces the number of frames—that is, increases the charge storage time of an imaging element—and improves visibility even under low illumination (see Patent Literature 2).

CITATION LIST

Patent Literature

PTL 1
Japanese Patent Application Laid-Open No. 2005-30968
PTL 2
Japanese Patent Application Laid-Open No. 2003-250081

SUMMARY OF INVENTION

Technical Problem

However, with a conventional vehicle surroundings monitoring apparatus, in the case of a method whereby a point of contact between a ranging object and the road surface is recognized using a camera, as in Patent Literature 1, there is a problem of not being able to recognize a point of contact between a ranging object and the road surface correctly under low illumination, such as at night or in a dark indoor location. Also, in response to this problem, a method has been reported in an example of conventional technology in Patent Literature 2 whereby the number of frames output from a camera is reduced to a range (up to 15 fps) that enables real-time capability to be secured with a typical moving image, but a problem is that the amount of reduction in the number of frames in order to secure real-time capability as a moving image is limited, and depending on the ambient illumination, it may not be possible to obtain video with sufficient contrast even when using conventional technology. There is also a problem of an image being blurred when the number of frames is decreased (=the exposure time is lengthened) due to the speed of movement of the vehicle.

It is an object of the present invention to provide a vehicle surroundings monitoring apparatus that enables a surroundings monitoring situation to be presented to a user accurately even under low illumination.

Solution to Problem

A vehicle surroundings monitoring apparatus of the present invention has a configuration comprising: a necessary image time calculation section that calculates an image storage time necessary to obtain a certain contrast, based on illumination information of an illumination estimation section; a possible image storage time calculation section that calculates an image storage time that suppresses image blurring to within a certain range, based on vehicle speed obtained by a vehicle information acquisition section; a recognition possibility/impossibility determination section that compares a necessary image storage time calculated by the necessary image storage time calculation section and a possible storage time calculated by the possible image storage time calculation section, and determines whether or not it is possible to secure a storage time necessary for image recognition; and an output information generation section that outputs information relating to an obstacle detected by an image recognition section, or, if the recognition possibility/impossibility determination section cannot secure an image storage time, information indicating a state in which recognition is impossible.

Advantageous Effects of Invention

Through the provision of a recognition possibility/impossibility determination section that makes a determination by comparing a necessary image storage time calculated from a captured image and a possible image storage time calculated from vehicle information, a vehicle surroundings monitoring apparatus of the present invention can determine whether or not image recognition is possible according to imaging environment illumination conditions and the vehicle state, and can display an obstacle accurately under low illumination if image recognition is possible, and also display the fact that recognition is difficult if image recognition is not possible.

DESCRIPTION OF EMBODIMENT

Now, an embodiment of a vehicle surroundings monitoring apparatus of the present invention will be described with reference to the accompanying drawings.

Figure 1:
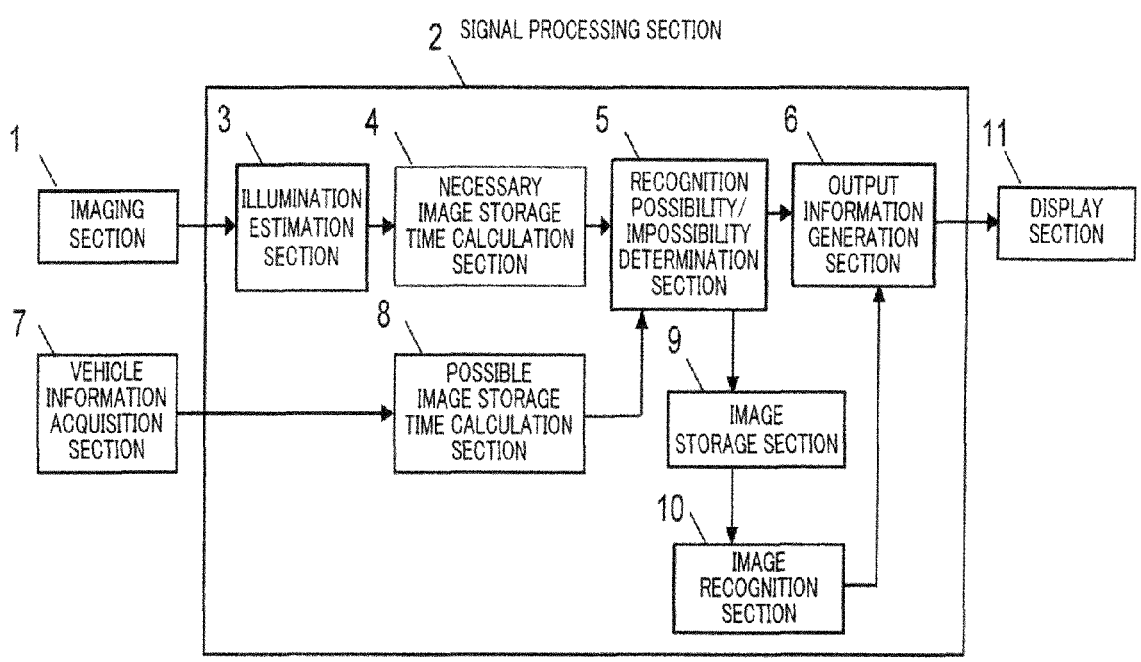
FIG. 1 is a block diagram showing the configuration of a vehicle surroundings monitoring apparatus according to an embodiment of the present invention.

FIG. 1 is a block diagram showing the configuration of a vehicle surroundings monitoring apparatus according to an embodiment of the present invention.

In the vehicle surroundings monitoring apparatus in FIG. 1, imaging section 1 images the situation around the vehicle, and vehicle information acquisition section 7 acquires information such as the vehicle speed. Imaging section 1 may be a camera using a CCD or CMOS device. Vehicle information acquisition section 7 acquires, for example, a vehicle speed signal obtained from the vehicle, using an A/D conversion I/F in the case of an analog signal, and an I/F that acquires a CAN signal in the case of CAN information. In addition, illumination sensor information and a steering wheel steering angle value may also be acquired as vehicle information.

Signal processing section 2 processes image data using image data captured by imaging section 1 and vehicle information from the vehicle information acquisition section, and outputs a surroundings monitoring situation to display section 11. Signal processing section 2 comprises illumination estimation section 3, necessary image storage time calculation section 4, recognition possibility/impossibility determination section 5, output information generation section 6, possible image storage time calculation section 8, image storage section 9, and image recognition section 10. Illumination estimation section 3 estimates imaging environment illumination for an image input from imaging section 1, and necessary image storage time calculation section 4 calculates an image storage time necessary in order to obtain contrast enabling image recognition from the illumination estimated by illumination estimation section 3. Possible image storage time calculation section 8 calculates a possible image storage time according to a vehicle speed input from vehicle information acquisition section 7. Recognition possibility/impossibility determination section 5 compares a necessary image storage time input from necessary image storage time calculation section 4 and a possible image storage time input from possible image storage time calculation section 8, and determines whether or not image recognition is possible. If image recognition is determined to be possible by recognition possibility/impossibility determination section 5, image storage section 9 sequentially stores image data captured by imaging section 1, and image recognition section 10 performs superimposition and combination of images stored in image storage section 9, generates an image with improved contrast, and recognizes whether or not there is an obstacle. Output information generation section 6 generates information to be output to a user for information relating to an obstacle recognized by image recognition section 10, or information indicating that recognition has been determined to be impossible by recognition possibility/impossibility determination section 5, and outputs this information to display section 11. Display section 11 is, for example, a monitor installed in the area around the driver's seat, and displays information generated by signal processing section 2. Display section 11 may also be another information output device, or may be a speaker or vibration apparatus, or an icon display in the instrument panel.

The operation of a vehicle surroundings monitoring apparatus configured as described above will now be explained.

Figure 2:
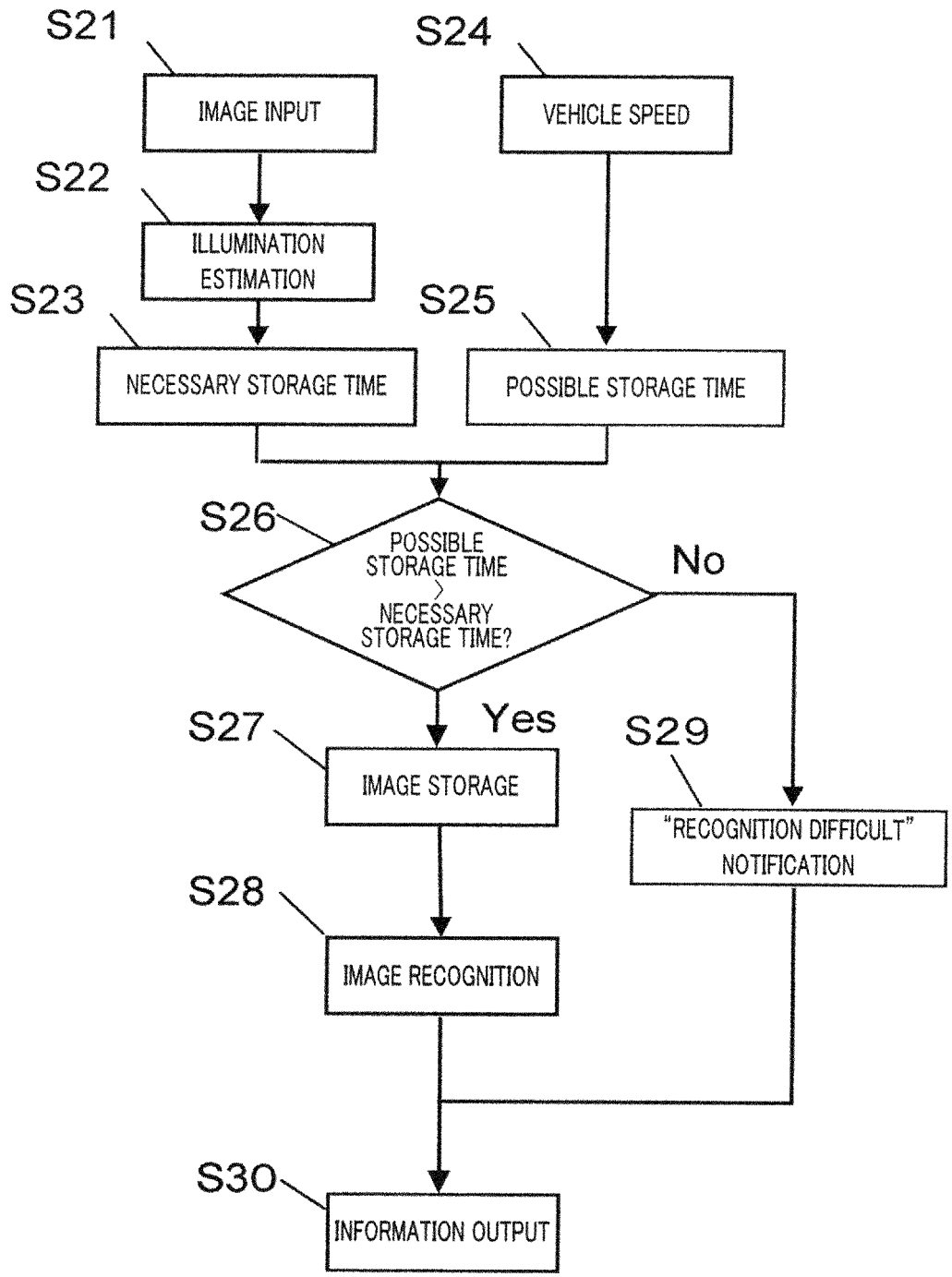
FIG. 2 is a flowchart for explaining the operation of the above apparatus.

FIG. 2 is a flowchart of signal processing in the vehicle surroundings monitoring apparatus.

Figure 3:
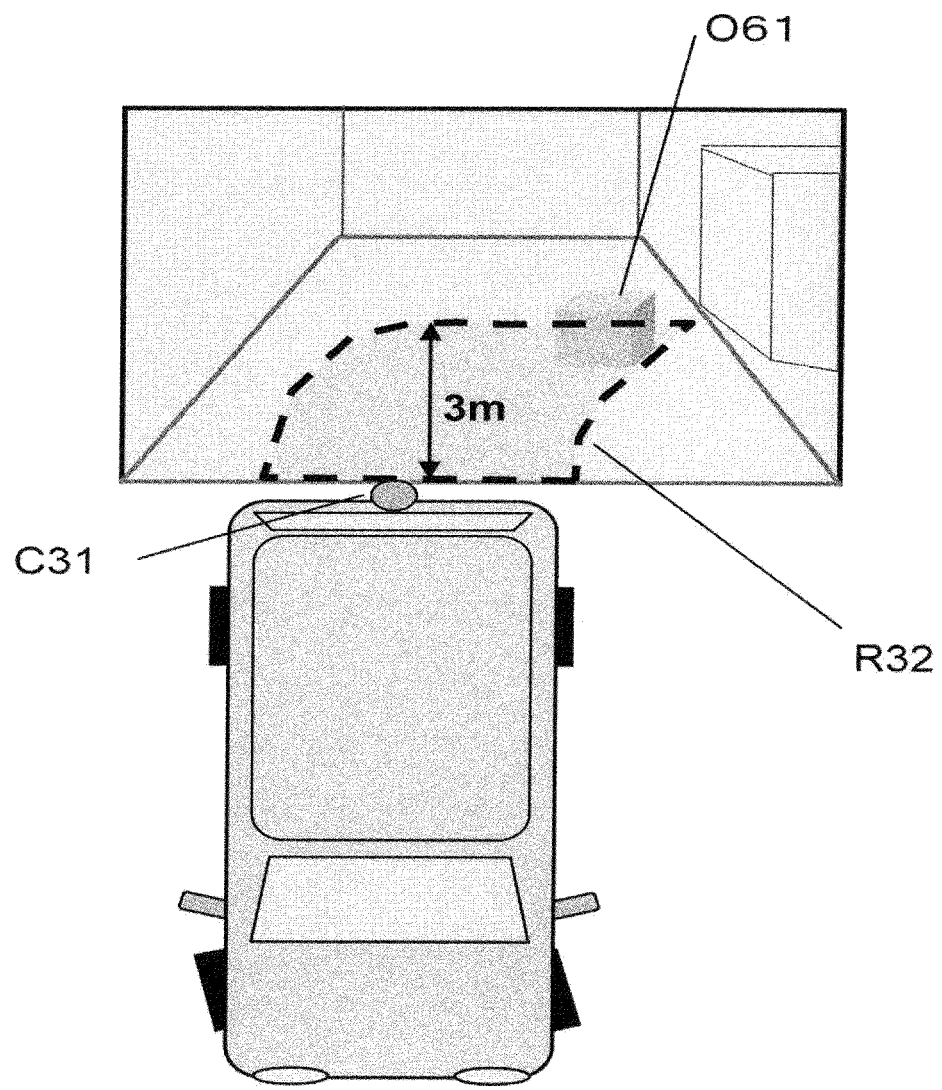
FIG. 3 is a drawing showing the processing range of illumination estimation according to the above apparatus.

When signal processing is executed, first, in step S21, new image data is read by imaging section 1 and stored in memory. In step S22, illumination estimation section 3 estimates illumination of the imaged environment from image data output by imaging section 1. In illumination estimation, an average of the brightness values of pixels in a predetermined area of image data is taken as an illumination estimation value, for example. As regards a desirable predetermined area, illumination estimation should be performed at a certain distance from the vehicle and within a predicted range of movement of the vehicle. FIG. 3 shows an example of predetermined area R32 of an image captured by rear camera C31. Predetermined area R32 in FIG. 3 is assumed to be an area with a distance of 3 m and in which the predicted range of movement is bounded by a travel path predicted from a steering wheel steering angle.

Figure 4:
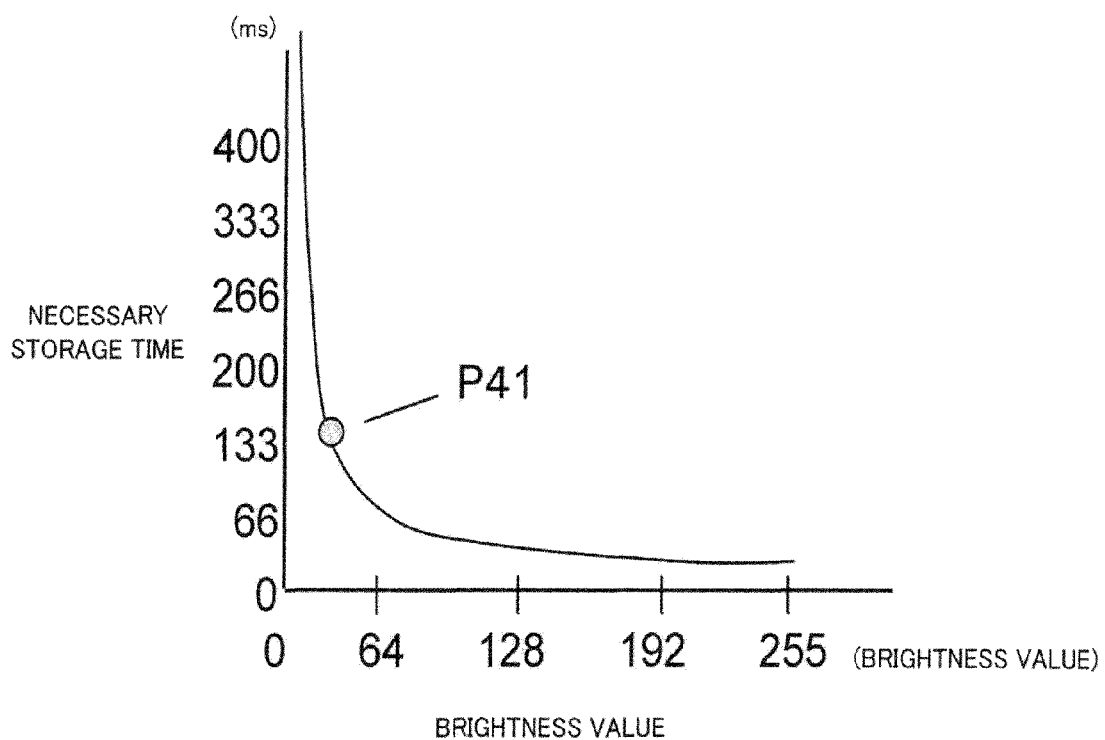
FIG. 4 is a drawing showing the relationship between a brightness value and necessary storage time according to the above apparatus.

In step S23, necessary image storage time calculation section 4 calculates an image storage time necessary in order to obtain contrast enabling the presence or absence of an obstacle to be recognized, for a predetermined area from an illumination estimate estimated in step S22. A storage time can be calculated from the camera's imaging frame rate and the necessary number of stored images, and data is prepared beforehand that relates an illumination estimate (brightness) to the number of stored images. FIG. 4 shows an example of data relating illumination (brightness) to a number of stored images. Taking a case in which the average brightness value in the predetermined area in FIG. 4 is 32 (P41) as an example, the necessary storage time at that time is 133 msec.

Figure 5:
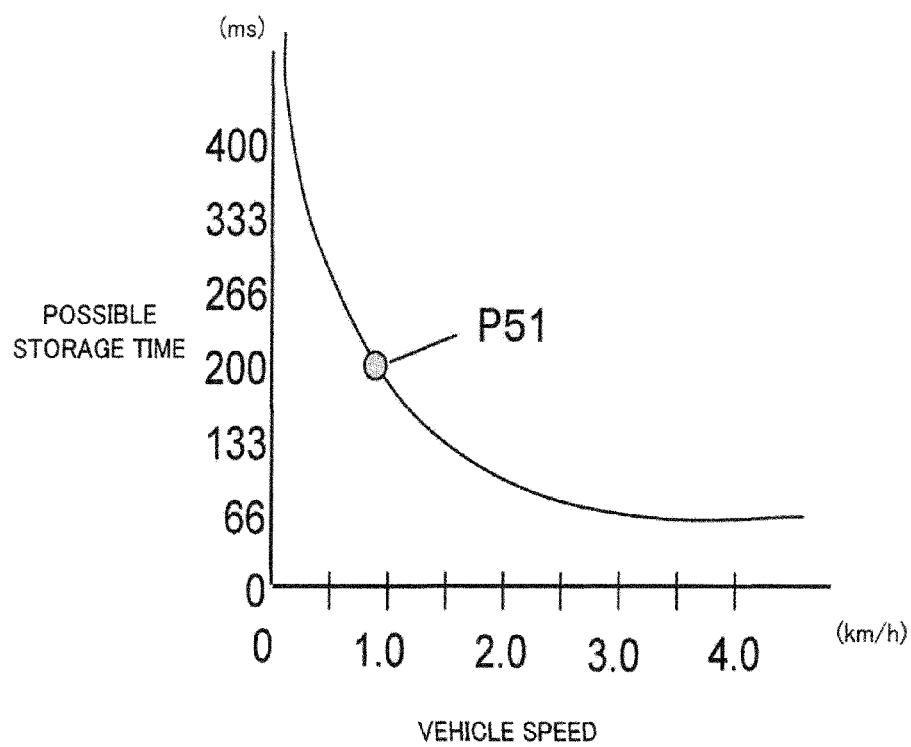
FIG. 5 is a drawing showing the relationship between vehicle speed and possible storage time according to the above apparatus.

In step S24, vehicle speed is acquired from vehicle information acquisition section 7 and stored in memory. In step S25, possible image storage time calculation section 8 calculates a possible image storage time from the vehicle speed acquired in step S24. Generally, as vehicle speed increases, the position of image data captured by a camera also changes within subject image data, and therefore if storage time is long, stored image data produces a blurred image. As a result, it is difficult to perform image recognition of an object within image data, and an image that is difficult to understand is produced as user display data. In order to prevent such a phenomenon, an upper limit of storage time is set as a possible storage time according to vehicle speed, and data is produced that relates vehicle speed to possible storage time as shown in FIG. 5, for example. In FIG. 5, taking P51 indicating a vehicle speed of 0.9 km/h as an example, the possible storage time at that time is 200 msec. Also, As can be seen from FIG. 5, when the vehicle speed is 0 km/h—that is, the vehicle is stationary—the possible storage time is infinite, and the necessary image storage time can in principle be made infinite.

In step S26, recognition possibility/impossibility determination section 5 inputs the necessary image storage time calculated in step S23 and the possible image storage time calculated in step S25, and compares the lengths of the times. If the possible image storage time is longer than the necessary image storage time, recognition possibility/impossibility determination section 5 determines that image blurring is within a permissible range and that time for storing image data necessary for recognition can be secured, enables image storage mode, and proceeds to step S27 in which image storage is performed. On the other hand, if the possible image storage time is shorter than the necessary image storage time, recognition possibility/impossibility determination section 5 determines that image blurring is outside a permissible range and that time for storing image data necessary for recognition cannot be secured, disables image storage mode, and proceeds to step S29 without performing image storage. For example, in the case of average brightness of 32 and a vehicle speed of 0.9 km/h given as examples above in steps S23 and S25, the necessary image storage time is 133 msec as shown by reference code P41 (an image with average brightness of 32) and a time for which image storage is possible is 200 msec as shown by reference code P51 (a vehicle speed of 0.9 km/h), and in this case image storage mode is enabled.

Figure 6:
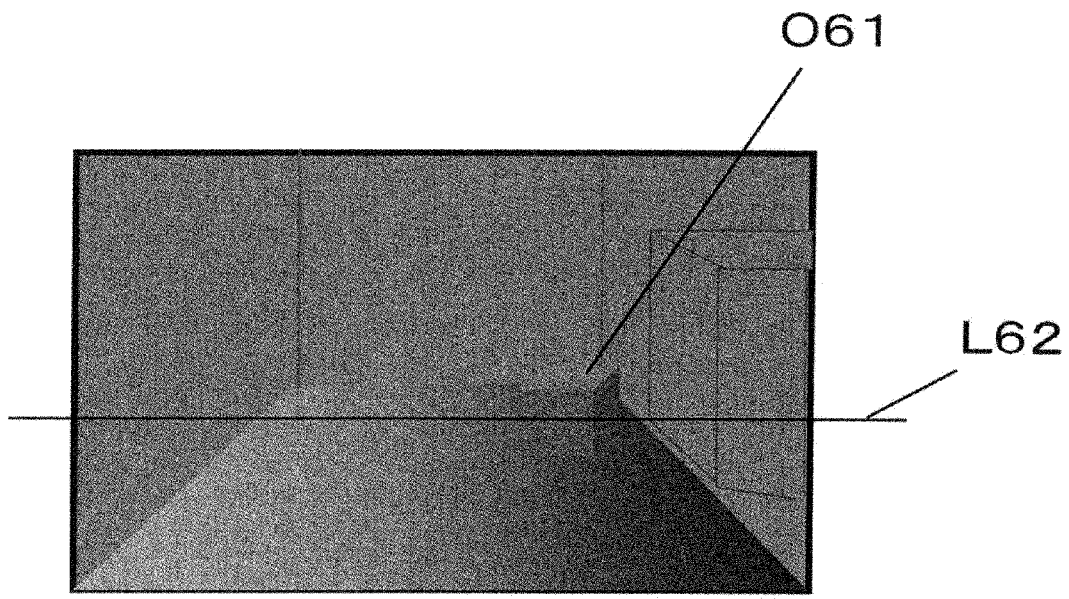
FIG. 6 is a conceptual drawing showing captured image data according to the above apparatus.
Figure 6:
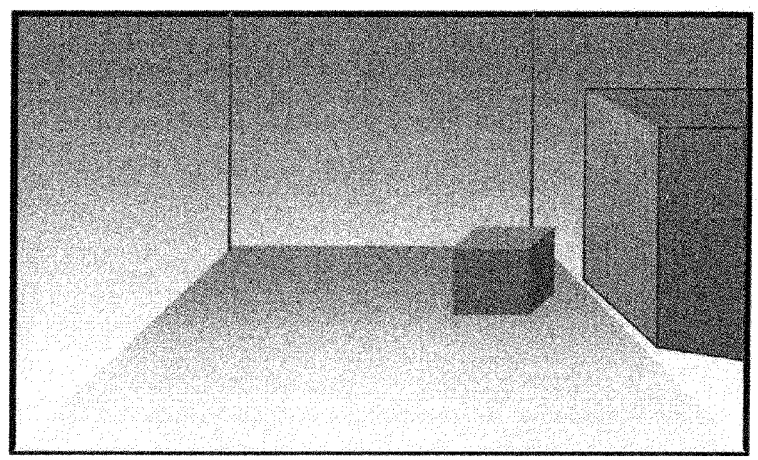
Figure 7:
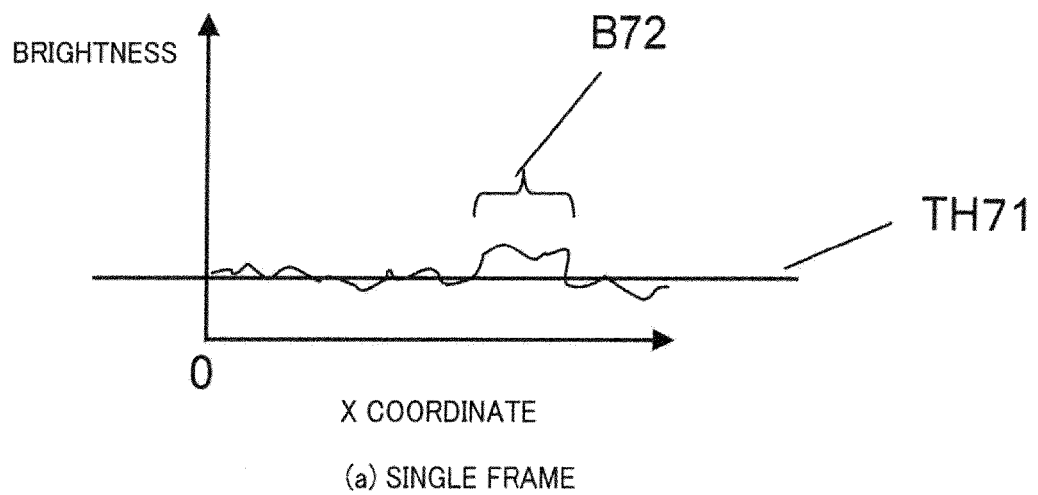
FIG. 7 is a drawing showing brightness data distribution according to the above apparatus.
Figure 7:
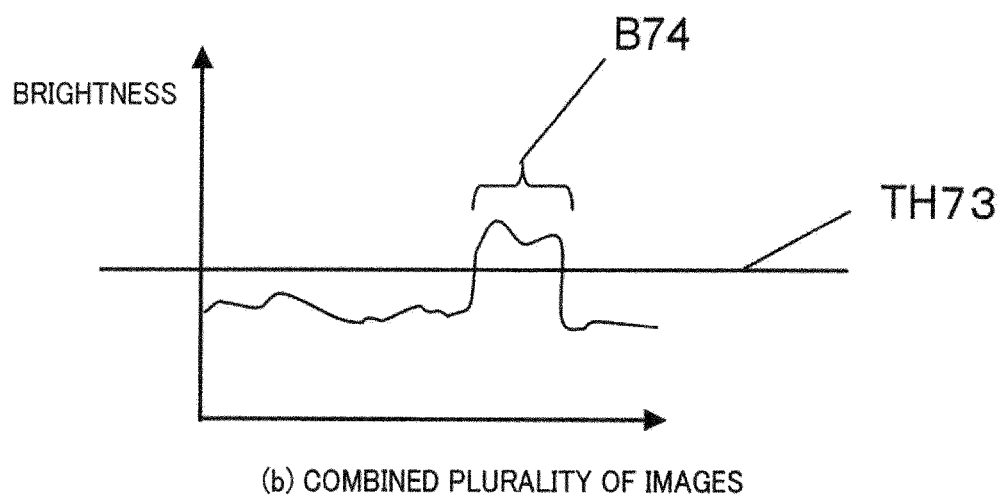

In step S27, image storage section 9 stores images input from imaging section 1, and combines the images. An overview of how image contrast necessary for recognition is improved by storing and combining these images will now be given with reference to FIG. 6 and FIG. 7. FIG. 6 (*a*) is a conceptual drawing of image data when the area behind a vehicle is imaged by a rear-view camera in a dark location. In FIG. 6 (a), object O61 shows little difference in brightness from ambient noise (low contrast), and it is difficult to detect a boundary between the road surface and object by means of image processing with a single frame of image data. The concept of contrast improvement by combining stored images will now be explained with reference to FIG. 7. FIG. 7 (a) shows pixel brightness values at line L62 in FIG. 6 (a). FIG. 6 (a) shows single-frame brightness data, and there is little difference in brightness between the relevant part of object O61 (B72) and ambient noise, and recognition is impossible with threshold value TH71. FIG. 7 (b) is a drawing showing brightness data when image data for a necessary image storage time are combined. In FIG. 7 (b), if ambient noise is assumed to be random noise, noise components are averaged even if a plurality of images are combined. On the other hand, if relevant parts of object O61 are combined, the signal level increases (B74), making it possible to discriminate between ambient noise and object O61 with threshold value TH73. A conceptual drawing showing an example of improved contrast as a result of storing and combining images in this way is shown in FIG. 6 (b).

Figure 8:
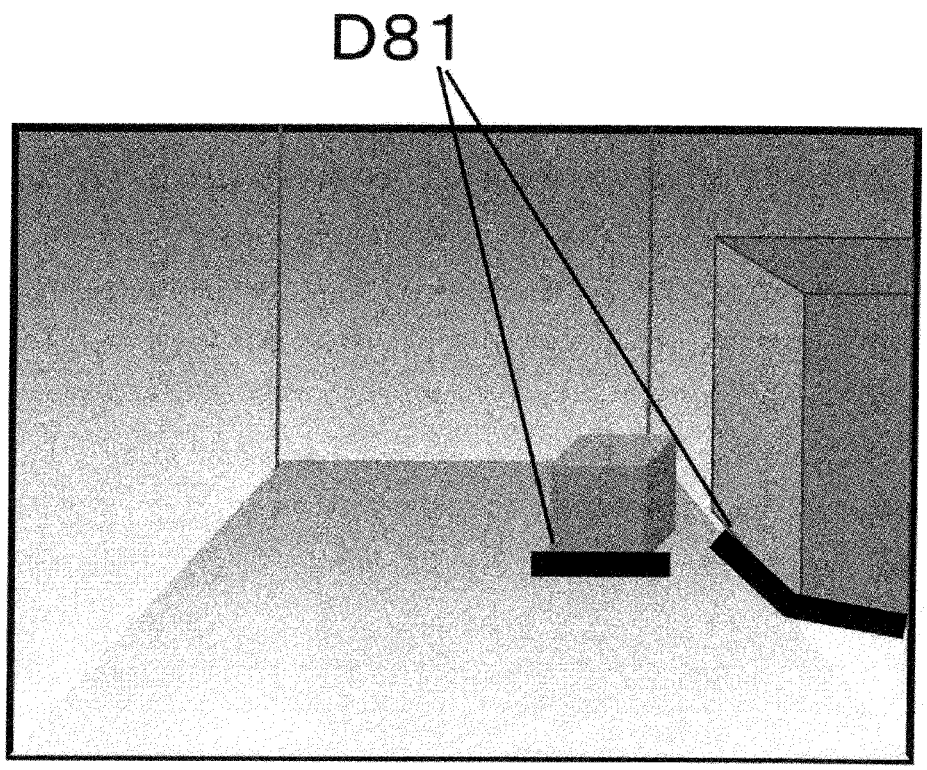
FIG. 8 is a drawing showing object detection according to the above apparatus.

In step S28, image recognition section 10 performs image recognition processing on a stored image obtained in step S27, performs determination of whether or not image recognition is in progress, and outputs a recognition result to step S30. Image recognition processing methods include, for example, extracting edges (D81) of boundaries between the road surface and obstacles as shown in FIG. 8, pattern matching, and so forth.

In step S29, if it has been determined in step S26 that the possible image storage time is shorter than the necessary image storage time—that is, that time for storing image data necessary for recognition cannot be secured—image storage mode is disabled, the image storage time is made 0, and information indicating that recognition of an obstacle within a predetermined range is difficult is output to step S30.

Figure 9:
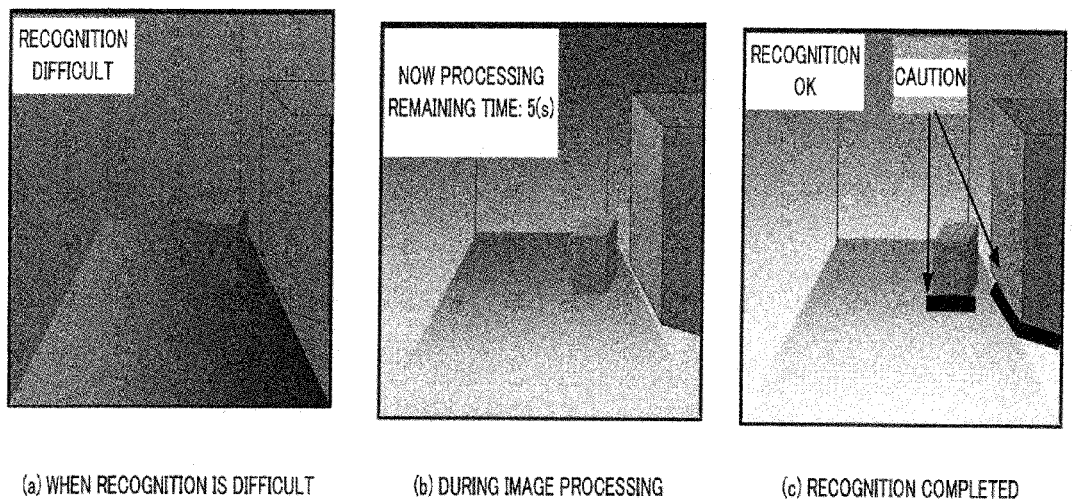
FIG. 9 is a drawing showing user displays according to the above apparatus.

In step S30, screen data generated based on output information generated in the step S28 and step S29 states is output to display section 11. FIG. 9 shows examples of screen data generated in the respective steps. In FIG. 9, (a) is a display example when notification that recognition is difficult is output in step S30. FIG. 9 (b) is an example in which recognition is possible and the fact that an image has been recognized and processing is in progress is displayed in step S28. By this means, a user can be informed of approximately how long he or she must wait until an image is displayed. FIG. 9 (c) is a display example when image recognition has been terminated in step S28 and a state in which an image can be displayed has been established, and it can be perceived from the recognition results whether or not there is an obstacle to which the user should pay attention.

In this embodiment, an example has been given in which the illumination of an imaged environment is estimated from input image data, but an illumination value, that is estimated from a value (outside illumination) of an illumination sensor installed on a vehicle and the brightness with which a predetermined area is illuminated from on/off states of vehicle lights (illumination by lights), may be used instead.

In this embodiment, an example has been given in which contrast is improved by storing and combining images of a plurality of frames, but a configuration may also be used to obtain the same kind of effect by calculating a necessary camera exposure time in a similar way and controlling the camera exposure time.

With regard to a necessary image storage time and possible image storage time, an example has been given in which data relating respective illumination values to speeds is provided, but provision may also be made for a plurality of relational data—prioritizing reliability or prioritizing time, and so forth—to be provided, and to be selected for use by the user.

As stated above, if ambient illumination is not 0 when vehicle speed is 0 km/h—that is, when the vehicle is stationary—in principle a state in which recognition is possible can be established with certainty by increasing the image storage time, and therefore it is possible to prompt the user to keep the vehicle stationary, until recognition is possible when a vehicle starts to reverse or moves forward.

According to a vehicle surroundings monitoring apparatus of an embodiment of this kind, recognition possibility/impossibility determination section 5 compares a necessary image storage time necessary for image recognition and a possible image storage time for which image storage is possible, determines whether or not image recognition is possible according to imaging environment illumination conditions and the vehicle state, and can display an obstacle accurately under low illumination if image recognition is possible, and also display the fact that recognition is difficult if image recognition is not possible.

The disclosure of Japanese Patent Application No. 2009-234780, filed on Oct. 9, 2009, including the specification, drawings and abstract, is incorporated herein by reference in its entirety.

INDUSTRIAL APPLICABILITY

As described above, through the provision of a recognition possibility/impossibility determination section that estimates illumination from captured image data, and makes a determination by comparing a necessary image storage time calculated from a captured image and a possible image storage time calculated from vehicle speed, a vehicle surroundings monitoring apparatus of the present invention determines whether or not image recognition is possible according to imaging environment illumination conditions and the vehicle state, and displays an obstacle even under low illumination if image recognition is possible, and also displays the fact that recognition is difficult if image recognition is not possible, and is suitable for use as a vehicle surroundings monitoring apparatus that accurately detects the situation around a vehicle by means of a camera.

REFERENCE SIGNS LIST

1 Imaging section
2 Signal processing section
3 Illumination estimation section
4 Necessary image storage time calculation section
5 Recognition possibility/impossibility determination section
6 Output information generation section
7 Vehicle information acquisition section
8 Possible image storage time calculation section
9 Image storage section
10 Image recognition section
11 Display section

The invention claimed is:
1. A vehicle surroundings monitoring apparatus comprising:
an imaging section that images an ambient situation;
an illumination estimation section that estimates illumination from an image captured by the imaging section;

a necessary image storage time calculation section that calculates a necessary image storage time that is an image storage time necessary to obtain a certain contrast, based on illumination information of the illumination estimation section;

a vehicle information acquisition section that detects vehicle speed;

a possible image storage time calculation section that calculates a possible storage time that is an image storage time that suppresses image blurring to within a certain range, based on vehicle speed obtained by the vehicle information acquisition section;

a recognition possibility/impossibility determination section that compares the necessary image storage time calculated by the necessary image storage time calculation section and the possible storage time calculated by the possible image storage time calculation section, and determines whether or not it is possible to secure an image storage time necessary for image recognition;

an image storage section that sequentially stores image data captured by the imaging section when the recognition possibility/impossibility determination section can secure the image storage time necessary for the image recognition;

an image recognition section that detects whether or not there is an obstacle in an image resulting from combining images stored by the image storage section;

an output information generation section that outputs information relating to an obstacle detected by the image recognition section, or, if the recognition possibility/impossibility determination section cannot secure the image storage time necessary for the image recognition, information indicating a state in which recognition is impossible; and a display section that displays information output by the output information generation section.

2. The vehicle surroundings monitoring apparatus according to claim 1, wherein the recognition possibility/impossibility determination section determines that the image storage time necessary for the image recognition can be secured when the necessary image storage time is shorter than the possible storage time, and determines that the image storage time necessary for the image recognition cannot be secured when the necessary image storage time is longer than the possible storage time.

* * * * *